United States Patent [19]
Kliment et al.

[11] 3,914,341
[45] Oct. 21, 1975

[54] HYDROGEL AND METHOD OF MANUFACTURING THE SAME

[75] Inventors: Karel Kliment, Princeton, N.J.; Richard Chromecek, Litchfield, Conn.; Miroslav Stol, Prague, Czechoslovakia; Vladimir Stoy, Prague, Czechoslovakia; Eva Gavrilova, Prague, Czechoslovakia

[73] Assignee: Ceskoslovenska akademie ved, Prague, Czechoslovakia

[22] Filed: Dec. 26, 1972

[21] Appl. No.: 318,185

Related U.S. Application Data

[63] Continuation-in-part of Ser. No. 1,546, Jan. 8, 1970, abandoned.

[30] Foreign Application Priority Data

Jan. 14, 1969 Czechoslovakia ............... 21869-69

[52] U.S. Cl. ............. 260/885; 260/2.5 M; 260/31.6
[51] Int. Cl.² ........,.................................. C08L 31/02
[58] Field of Search .................................... 260/885

[56] References Cited
UNITED STATES PATENTS 3,520,949   7/1970   Shepherd et al.................... 260/857

FOREIGN PATENTS OR APPLICATIONS
123,479   7/1967   Czechoslovakia .................. 260/885

*Primary Examiner*—Murray Tillman
*Assistant Examiner*—C. J. Seccuro

[57] ABSTRACT

A polymerized hydrogel comprising a major portion of a) a homopolymer of a glycol monomethacrylate of the formula

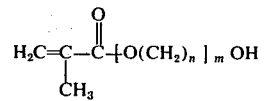

wherein $n = 2-3$ and $m = 1-3$ cross linked with a small amount of b) a mono- or dialkylene glycol dimethacrylate and copolymerized therewith as a filler therefor up to 35% by weight of component a) cross linked with at least 2% more of component b) then employed for cross-linking component a).

8 Claims, No Drawings

HYDROGEL AND METHOD OF MANUFACTURING THE SAME

CROSS-REFERENCE TO RELATED APPLICATIONS

This application is a continuation-in-part of application Ser. No. 1,546, filed Jan. 8, 1970, now abandoned.

BACKGROUND OF THE INVENTION

The present invention relates to hydrogel compositions and in particular to the manufacture of improved glycol methacrylate gels.

Glycol methacrylate gels which are only sparingly cross linked and swellable in aqueous liquids are widely used due to their excellent properties. They are originally developed for surgical use as prosthetic materials, such as, in the manufacture of contact lenses. They can be used, however, for many purposes such as for example membranes for dialysis and for other uses such as are disclosed in U.S. Pat. No. 2,976,576.

However, the mechanical strength of glycol methacrylate gels, when swollen to equilibrium in water or in an aqueous solution is not sufficiently great and it is therefore necessary to stiffen and reinforce the hydrogels. Polyester fabrics, webbings or active mineral fillers such as finely divided silica have been used for this purpose. These materials are, however, non-swellable, inert and tend to form foreign materials in the gel, the latter property being undesirable. In Czechoslovakian Pat. No. 123,479, ground waste hydrogels of the same type as the hydrogel compositions involved were used as fillers in an attempt to form a more homogeneous hydrogel material. Ground particles are, however, not homogeneous in shape and size and contain a variable concentration of free radicals which participate in the reaction upon polymerization. The waste hydrogel is also sparingly cross linked similarly to the subsequently formed hydrogel, and, therefore, does not substantially enhance its strength. The foregoing results in a hydrogel having the same physical properties as the original one, i.e., the waste material. Furthermore, the prior-art hydrogels always have their cross linked components lying in the same range of less than 2% by weight and usually 0.2 to 0.5% by weight.

SUMMARY OF THE INVENTION

It is an object of the present invention to provide an improved hydrogel composition and a method of manufacturing the same.

Another object of this invention is to provide an improved hydrogel composition having increased mechanical and physical strength when swollen in aqueous solvents and a method for manufacturing the same.

A further object of the present invention is to provide an improved glycol methacrylate gel having a strength enhancing filler.

Still another object of the present invention is to provide an improved glycol methacrylate hydrogel having a filler of the same material, which filler is highly cross linked as compared with the remainder of the gel and a method of polymerizing the same.

These and other objects and advantages will become apparent from a consideration of the following description.

Broadly speaking, the instant invention includes the provisions of a polymerized hydrogel comprising a major portion of a monomer mixture consisting of a homopolymer of an alkylene or dialkylene glycol monomethacrylate of the formula

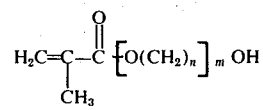

wherein $n = 2$ or $3$ and $m = 1-3$ and cross linked by an agent selected from the group consisting of alkylene glycol dimethacrylate and dialkylene glycol dimethacrylate copolymerized with a minor portion of the filler corresponding to a homopolymer of one of said monomers cross linked by about more than 2% by weight of said cross-linking agent and a method of making the same.

It is critical to the instant invention that the filler be cross linked by at least 2% or more of the cross-linking agent than employed to cross link the major portion of the hydrogel.

It is, therefore, essential that there be a difference in the amounts of cross-linking agent of at least 2%. In some instances it may be desirable to employ as little or less than 2 or 3% for cross linking the major portion of the homopolymer, while using as little as 4 or 5% cross-linking agent for the filler, the criticality lying in the absolute difference between the two degrees of cross linking.

The foregoing is broadly speaking accomplished by polymerizing the monomer mixture containing a small amount of cross-linking agent in the presence of a filler wherein the filler is a polymer of the same material, cross linked with about 2% more of the respective dimethacrylate. Preferably the filler is formed as discrete rounded or spherical particles having a grain size of between about 0.1 and 100 $\mu$, and preferably about 1 to 5 $\mu$.

The filler as is apparent is more cross linked than the basic polymer. This higher degree of cross linking manifests itself by a low swelling capacity in water with an accompanying high degree of strength. Inasmuch as permeability is associated with the degree of swelling, valuable physio-chemical properties are imparted to the product. The foregoing leads to differences in the network densities between the matrix having the lower density and the filler particles having the higher density. The matrix of lower network density has relatively no or only very little strength.

DESCRIPTION OF THE INVENTION

Particularly suitable as fillers are polymers prepared by polymerization of a solution of glycol methacrylate in a liquid dissolving only the monomer while precipitating the resultant polymer. Suitable solvents include xylene, toluene, benzene and the like.

Similar active fillers may be prepared by suspension polymerization, but the particles of the polymer obtained in the presence of a precipitated liquid such as toluene have an especially suitable size of between 0.1 and 100 $\mu$. The particles are, moreover, very uniform in size and most particles of any particular batch differ only very slightly in their diameters. The manufacture of these rounded or spherical particles is described in copending U.S. Pat. application Ser. No. 731,259 filed on May 22, 1968.

Suitable fillers are prepared by copolymerizing ethylene glycol monomethacrylate with from 2 to 30% ethylene glycol dimethacrylate in the presence of a liquid solvent for the monomer but not for the resultant copolymer. If the precipitating liquid is used in an appropriate concentration of about 40% or more, the resultant copolymer forms a porous, brittle material settling out easily as the desired powder. It can be very easily disintegrated to individual non-porous particles having less than 10 $\mu$ diameters. Suitable solvents for use in this connection also include diacetone and glycerol.

During the subsequent polymerization of the monomer mixture containing the above-described active filler, the particles of the filler swell and the monomer polymerizes partially inside the same as well as on their surfaces. Thus, the particles become chemically bonded to the surounding hydrogel. The particles of the filler containing some fixed free radicals and pendant vinyl groups participate actively in the polymerization as initiators and simultaneously as cross-linking agents. This results in a noticeable increase in the polymerization velocity. The swelling in water to the equilibrium point is decreased in proportion to the amount of the active filler, according to the changed cross-linking density of the resulting polymer as can be seen from Table 1 which follows hereinafter.

As stated, the difference in network clearly is important to the resultant product. The object is to improve the mechanical properties of the hydrogel, this may be accomplished by preparing physically heterogeneous polymers, while at the same time avoiding chemical heterogeneity. The type of monomers are essentially the same; there is, however, a ratio difference between the monoester and diester. The outstanding mechanical properties thereof particularly tensile strength and tear resistance being the result of the substantially perfect bonding of the filler with the matrix as a result of the chemical similarity of the two. The denser filler particles accommodate a portion of the polymerized monomer on their surfaces. This effect cannot however be achieved where the components have the same mechanical properties, i.e., are homogeneous.

While not wishing to be bound by any particular theory, it is believed that the size and shape of the filler particles play an important roll. Particles of larger size than mentioned above, and having an irregular shape, will not improve mechanical properties. On the other hand, the instant small, spherical particles have a large surface area and are thus operative to spread or enlarge the interface.

Table 1

Equilibrium volume swelling of the filled hydrogel against the content of the active filler

| content of active filler % by weight | equilibrium volume swelling % |
|---|---|
| 0 | 58.9 |
| 5 | 58.4 |
| 10 | 53.2 |
| 15 | 35.3 |
| 20 | 28.0 |
| 25 | 24.3 |
| 30 | 22.8 |

Mechanical properties of polymers filled with the above mentioned active fillers are substantially higher than those of a non-filled hydrogel as shown in the following Table.

Table 2

Strength and deformation characteristics of hydrogels filled with rounded or spherical particles of polymeric cross-linked glycol methacrylate, grain size 1-2 $\mu$

| active filler contained % weight | tensile strength (kpcm$^{-2}$) (5°C,10 mm s$^{-1}$) | tear resistance (kpcm$^{-1}$) (25°C, 5mm s$^{-1}$) | penetration life (s) (40°C, 300kpcm$^{-2}$) | equilibrium shear elasticity modulus (kpcm$^{-2}$) (25°C) |
|---|---|---|---|---|
| 0 | 9 | 0.28 | 1.5 | 2.9 |
| 10 | 30 | 3.26 | 75.0 | 5.9 |

EXAMPLE 1

A prepolymer was prepared by polymerizing ethylene glycol monomethacrylate containing 1% of ethylene glycol dimethacrylate, in the presence of 0.1% dibenzoyl peroxide as a polymerization initiator, at a temperature of 75° C, and interrupting the polymerization prior to gelling. After the prepolymer was cooled down to the room temperature, 10% by weight of finely divided ethylene glycol monomethacrylate polymer cross-linked with 1.5% of ethylene glycol dimethacrylate, (the size of the round-shaped particles being between 0.5 and 2 $\mu$) and 0.1% dibenzoylperoxide were added into 89.9% of said prepolymer while stirring steadily. The resultant viscous paste was polymerized in a closed mold to an insoluble hydrogel sheet of 1 mm thickness, by heating it at 80°C for 2 hours.

EXAMPLE 2

A sheet of hydrogel was prepared in absence of the filler in the same manner as described in Example 1.

EXAMPLE 3

Samples of hydrogel were prepared as described in Example 1, but the content of the corresponding cross-linking agent in the prepolymer and filler was varied as follows:

| prepolymer | filler |
|---|---|
| 1.5% | 2.5% |
| 2.5% | 5.0% |
| 1.0% | 10% |
| 1.0% | 15% |

Characteristics of the tensile strengths of both the unfilled and filled hydrogels made according to Examples 1 and 2, have been measured at 5°C and testing rate 10 mm s$^{-1}$. Results are set out in Table 3:

Table 3

Tensile strengths of hydrogel samples (kp cm$^{-2}$) with varying content of the cross-linking agent in the prepolymer and filler (in % by weight):

Table 3

Tensile strengths of hydrogel samples (kp cm$^{-2}$) with varying content of the cross-linking agent in the prepolymer and filler (in % by weight):

| prepolymer | filler | tensile strength |
|---|---|---|
| 1.0 | — | 8.0 ± 0.2 |
| 1.0 | 1.5 | 9.7 ± 0.4 |
| 1.5 | — | 10.3 |
| 1.5 | 2.5 | 13.8 |
| 2.5 | — | 12.7 |
| 2.5 | 3.0 | 14.2 |
| 1.0 | 10 | 23.5 |
| 1.0 | 15 | 28.8 |

EXAMPLE 4

5% by weight of a non-cross-linked ethylene glycol methacrylate polymer of high molecular weight in the form of a dry powder was dissolved while stirring in 95% of ethylene glycol monomethacrylate, containing 0.30% by weight of ethylene glycol dimethacrylate. 10% by weight of finely divided glycol monomethacrylate polymer cross-linked with 20% ethylene glycol dimethacrylate, grain size 1–2 $\mu$ was admixed while stirring steadily with the above mentioned viscous solution of the polymer in monomer. The highly viscous white liquid was filled into a suitable mold and polymerized by heating with 0.1% of dibenzoyl peroxide to 80°C under an inert gas for 45 minutes.

The final composition of the polymerization mixture was:

| | | |
|---|---|---|
| Ethylene glycol methacrylate | 80.9% | by weight |
| Soluble non-cross-linked polymer | 9% | |
| Active filler (cross-linked polymer) | 10% | |
| Dibenzoyl peroxide | 0.1% | |

EXAMPLE 5

A prepolymer, having a refraction index $n_d^{20}$=1.4530 and a dynamic viscosity of 163 cp was prepared by polymerizing ethylene glycol monomethacrylate containing 0.15% of ethylene glycol dimethacrylate and interrupting the polymerization prior to gelling. 20% by weight of finely divided cross-linked polymer as described in Example 1 and 0.1% by weight of tert. butyl peroctoate were introduced into 79.90% of said prepolymer while stirring steadily. The milky white viscous paste can be polymerized to an insoluble cross-linked hydrogel by heating it to 65° – 70°C under an inert gas.

EXAMPLE 6

A polymerization mixture according to Example 1 or 2 was mixed with crystalline magnesium sulfate in a ratio of 40% by weight of the mixture and 60% of the crystals. After having been stirred thoroughly, the mixture was filled into molds and polymerized by heating under an inert gas. The white polymer which was formed was washed in water. The crystals of magnesium sulfate were thereby dissolved. The spongly material had pores of 300–400 $\mu$ in diameter. By choosing a suitable type of crystalline salt and its amount it is possible to manufacture sponge-like products having different size and density of pores.

EXAMPLE 7

25% of glycol methacrylate polymer cross-linked with 35% of glycol dimethacrylate was added while stirring to 74.5% by weight of the prepolymer according to Example 2, together with 0.5 cobalt naphthenate. The polymerization was completed at room temperature in about 30 minutes, beginning within 10 minutes.

EXAMPLE 8

10% by weight of finely divided diethylene glycol monomethacrylate, cross-linked with 24% diethylene glycol dimethacrylate, grain size 5 – 8 $\mu$, was stirred into 89% by weight of diethylene glycol monomethacrylate, containing 0.45% of diethylene glycol dimethacrylate and thereafter 0.4% by weight of diisopropyl percarbonate and 0.6% by weight of cobalt naphthenate were added to the homogenized mixture. The polymerization began at room temperature within 10 minutes.

EXAMPLE 9

The procedure of Example 1 was repeated except that the monomer was cross-linked with 1.0% of a cross-linking agent and the polymer was cross-linked by 3.0% cross-linking agent.

EXAMPLE 10

The procedure of Example 9 was repeated except that the proportions of cross-linking agent were varied out as follows: 1.5 and 3.9%, respectively.

EXAMPLE 11

The procedure of Example 9 was repeated excepting that the proportions of cross-linking agent were varied as follows: 1.9 and 4.5%, respectively.

Additional products of the type herein disclosed may be produced employing propylene glycol, triethylene glycol and the like.

Hydrogels filled with active fillers of the above described kind are chemically homogeneous. The basic sparingly cross-linked, soft and elastic gel is filled with tightly cross-linked stronger particles through which it is bound into a uniform whole. The structure thus obtained is particularly advantageous since it combines elasticity, softness and permeability to water and ions with comparatively high strength and good chemical and physiological stability. The fillers may be used in mixtures with monomers or prepolymers, or also in monomer mixtures thickened with soluble non-cross-linked glycol methacrylate polymers. The last two mentioned embodiments are advantageous because the high viscosity of the mixture prevents sedimentation of the filler. Monomeric mixtures may contain water or a solvent miscible with water, in order to control the equilibrium swelling capacity of the resulting polymer.

The polymerization may be carried out by any of the known methods as previously described with hydrogels based on glycol methacrylate monomers. As polymerization initiators e.g. di-isopropyl percarbonate, tert, butyl peroctoate, dibenzoyl peroxide, ammonium persulfate, azo-bis-izobutyronitrile and the like may be used alone, if desired in combinotation, with or without various activators or accelerators with which they may form redox systems. It is also possible to add only an accelerator, or to heat or irradiate the mixture without adding an initiator when the active filler contains free radicals and residues of its own polymerization initiator. The amount of the added active filler amounts to from 0 to 35%. With a higher amount of the filler the mixture is no longer paste-like and can be worked but only with difficulty due to its rather solid and brittle consistency. Most suitable physical properties are obtained with 10 to 15% by weight of the filler. The monomer mixtures with added active filler may be kept for up to 2 months at temperatures below 0°C, without autopolymerization. The properties of the end product are not markedly affected by such storage.

The filler used according to the invention possesses the same chemical composition and similar molecular structure as the hydrogel. Therefore, the filled polymer has advantageous physiological properties as a pure hydrogel, without undergoing possible side reactions as may be the case when using inorganic fillers. This is important, particularly in the case where prostheses are formed from porous hydrogels and where the living tissue comes in contact with filler particles over a wide surface.

If the filler is added to the monomer mixture in a non-swollen state, the monomer penetrates partially into the filler particles so that the bond is particularly good.

Filled monomer mixtures thickened to a suitable viscosity at which the filler does not sediment, may be kept cool for a substantially long time and are suitable for use in the manufacture of various surgical and dental prostheses requiring implantation. Further uses such as self-polymerizing pastes for sealing containers and tubings for water and aqueous solutions, for sealing ships, for soft layers applied onto pelate surfaces of dentures etc. may also be made. To increase its adhesion to hydrophobic polymers, as for example, to polymethyl methacrylate, it is possible to add monomeric methyl methacrylate or an inert swelling agent such as glycerol diacetate or similar substance which dissolves the monomer or monomers.

From the above it will be seen that there is produced an improved hydrogel composition having the desired strength characteristics, chemical and physical properties set forth earlier.

We claim:

1. A hydrogel comprising a copolymer formed of a major portion of a monomer mixture consisting essentially of a glycol methacrylate selected from the group consisting of alkylene glycol methacrylate and dialkylene glycol methacrylate and less than 2% by weight of a glycol dimethacrylate crosslinking agent selected from the group consisting of alkylene glycol dimethacrylate and dialkylene glycol dimethacrylate and a minor portion of up to 35% by weight of said monomer mixture of a filler consisting of a polymer prepared by polymerizing a glycol methacrylate selected from the group consisting of alkylene glycol methacrylate and dialkylene glycol methacrylate and more than 2% by weight of a glycol dimethacrylate crosslinking agent selected from the group consisting of alkylene glycol dimethacrylate and dialkylene glycol dimethacrylate, the relative amounts of crosslinking agent in said filler being at least 2% greater than the relative amount of crosslinking agent in said monomer mixture.

2. A hydrogel as defined in claim 1, wherein said filler is included in an amount of from 10–15% by weight.

3. A hydrogel as defined in claim 1, wherein said filler has a grain size of about 0.1 to 100 $\mu$.

4. A hydrogel as defined in claim 1, including a thickening agent comprising a soluble non-cross-linked mono- or dialkylene glycol methacrylate polymer.

5. A hydrogel according to claim 1 including a thickening agent for said monomer mixture comprising a soluble non-crosslinked glycol methacrylate polymer selected from the group consisting of alkylene glycol monomethacrylate and dialkylene glycol monomethacrylate.

6. A method for preparing glycol methacrylate hydrogels according to claim 1 comprising the steps of polymerizing a monomer mixture consisting essentially of a glycol methacrylate selected from the group consisting of alkylene glycol monomethacrylate and dialkylene glycol monomethacrylate and less than 2% by weight of a glycol dimethacrylate crosslinking agent selected from the group consisting of alkylene glycol dimethacrylate and dialkylene glycol dimethacrylate in the presence of up to 35% by weight of said monomer mixture of a filler consisting essentially of a polymer prepared by polymerizing a glycol methacrylate selected from the group consisting of alkylene glycol methacrylate and dialkylene glycol methacrylate with more than 2% by weight of a glycol dimethacrylate crosslinking agent selected from the group consisting of alkylene glycol dimethacrylate and dialkylene glycol dimethacrylate.

7. Method according to claim 6 including the step of thickening said monomer mixture with a soluble non-crosslinked glycol methacrylate polymer selected from the group consisting of alkylene glycol monomethacrylate and dialkylene glycol monomethacrylate.

8. A method as defined in claim 6, including the step of thickening said reaction mixture by partial polymerization thereof, stopping said polymerization before gelation occurs, adding thereto said cross-linked filler and thereafter completing said polymerization.

* * * * *